United States Patent
Oomi et al.

(10) Patent No.: US 7,073,472 B2
(45) Date of Patent: Jul. 11, 2006

(54) STARTER HAVING STRUCTURE FOR PREVENTING OVERHEATING

(75) Inventors: Masanori Oomi, Anjo (JP); Tsutomu Shiga, Nukata-gun (JP)

(73) Assignee: Denso Corporation, Kariya (JP)

( * ) Notice: Subject to any disclaimer, the term of this patent is extended or adjusted under 35 U.S.C. 154(b) by 180 days.

(21) Appl. No.: 10/886,548

(22) Filed: Jul. 9, 2004

(65) Prior Publication Data

US 2005/0051126 A1  Mar. 10, 2005

(30) Foreign Application Priority Data

Sep. 9, 2003 (JP) ............................ 2003-316414

(51) Int. Cl.
*F02N 11/08* (2006.01)
(52) U.S. Cl. .............................. 123/179.25; 123/179.3; 290/38 R; 310/68 C
(58) Field of Classification Search ........... 123/179.25, 123/179.3; 290/38 R, 38 C; 310/68 C, 310/68 R; 318/473, 471; 361/25
See application file for complete search history.

(56) References Cited

U.S. PATENT DOCUMENTS

| 5,528,084 A | 6/1996 | Shiga et al. |
| 6,028,381 A * | 2/2000 | Yumiyama et al. ........ 310/68 C |
| 6,520,137 B1 * | 2/2003 | Ooizumi et al. .......... 123/179.3 |
| 6,634,332 B1 * | 10/2003 | Saito et al. ............... 123/179.3 |
| 2002/0153991 A1 * | 10/2002 | Haeusel et al. ............. 337/404 |

FOREIGN PATENT DOCUMENTS

| JP | A 59-185869 | 10/1984 |
| JP | A 10-66311 | 3/1998 |
| WO | WO 02/16763 A1 | 2/2002 |

* cited by examiner

*Primary Examiner*—Willis R. Wolfe
*Assistant Examiner*—Arnold Castro
(74) *Attorney, Agent, or Firm*—Oliff & Berridge, PLC

(57) ABSTRACT

A starter for cranking an internal combustion engine is composed of an electric motor, an output shaft driven by the motor, a pinion gear coupled to the output shaft, and a magnetic switch. Electric power is supplied to the motor from an on-board battery through a switch, a movable contact of which is driven by the magnetic switch. The movable contact is connected to a brush lead wire via a connection formed by soft-soldering. The connection formed by the soft-soldering is positioned close to the commutator and covered with an end cover, so that the temperature of the connection becomes higher than other places in the starter. The connection easily melts away to thereby shut off power supply to the motor when its temperature becomes unusually high, and thereby the starter is protected from overheating.

7 Claims, 4 Drawing Sheets

STARTER HAVING STRUCTURE FOR PREVENTING OVERHEATING

CROSS-REFERENCE TO RELATED APPLICATION

This application is based upon and claims benefit of priority of Japanese Patent Application No. 2003-316414 filed on Sep. 9, 2003, the content of which is incorporated herein by reference.

BACKGROUND OF THE INVENTION

1. Field of the Invention

The present invention relates to a starter for cranking an internal combustion engine, and more particularly to a starter that includes a structure for preventing overheating.

2. Description of Related Art

It has been becoming a serious problem that the earth is being warmed up by carbon dioxide contained in the atmosphere. To cope with this problem by reducing fuel consumption in an automobile vehicle, great efforts are being made in downsizing automotive parts and components. In a starter motor for cranking an engine, its size and weight have been considerably reduced. On the other hand, the downsizing brings a problem of overheating. To overcome the overheating problem, various measures, such as improving heat-durability of materials used in the starter, have been taken. Such measures, however, have not been sufficiently effective to overcome the overheating problem.

If it is difficult to start an engine, or if a key-switch does not return to its original position, a large amount of current, such as several hundreds amperes, continues to flow through a starter for a long time. If this happens, the starter overheats and a further serious problem may follow. If a switch for supplying current to the starter is not opened due to its malfunction after the engine is successfully cranked up, several tens amperes may be continuously supplied to the starter. In this case, the starter continues to rotate at a high speed. Not only the starter is overheated but also commutator segments may be separated from a commutator surface by a high centrifugal force applied thereto. This may results in a complete loss of the starter.

Various proposals have been made as to ways and methods to shut off the current supply to the starter under such accidental situations mentioned above. For example, JP-A-10-66311 and WO-02/16763A1 propose to provide a fuse that melts away when the starter is overheated. Such a fuse may be provided in a main circuit for supplying current to the starter or in a pig tail connecting brushes. The fuse may be formed by reducing a cross-sectional area of a certain portion of the circuit. On the other hand, DE-10044081A1 and JP-A-59-185869 propose to form a solder-connection at certain position of a main circuit for supplying current to the starter, so that current supply is shut down by deformation or melting of the solder-connection when the starter is overheated.

The overheating problem, however, has not been sufficiently solved by those proposals. When the proposed fuse is used in the starter circuit, the fuse is blown away at a certain amount of current peculiar to that fuse. The amount of current flowing through the starter under no load condition is several tens amperes, while the amount of current is as high as several hundreds amperes when the starter is continuously operated without succeeding in cranking up the engine. Therefore, it is difficult to shut down the current in various levels with a single fuse. That is, if the fuse is designed to be blown at several hundreds of amperes, it is successfully blown by a high level of current, but it is not blown by a low current such as several tens of amperes.

On the other hand, if the fuse is designed to be blown by a low level current, there is a possibility that the current supply is unnecessary shut down. In addition, it is unavoidable that a resistance in the circuit is increased by such a fuse, resulting in decrease in the starter output. Because a large amount of current usually flows in the starter, the starter output is considerably reduced if there is an increase in resistance even in a small amount. To compensate such output decrease, the starter has to be made larger, which is contradictory to the downsizing.

In the technology of forming the solder-connection in the main circuit (proposed by DE-10044081A1 and JP-A-59-185869), it is expected that the solder-connection is deformed or disconnected without fail before components of the starter are damaged by overheating. For this purpose, the solder-connection has to be formed at a position where temperature is the highest and at a position that is closest to a power source such as a battery. Usually, the position where the temperature is the highest is a commutator surface which brushes slidably contact. However, it is difficult to form the solder-connection at a place where constant heat conduction from the commutator surface can be expected.

JP-A-59-185869 shows a solder-connection formed between a terminal bolt of a magnetic switch and a stationary contact. It further shows a resilient member for forcibly separating the circuit when the solder-connection melts away at a high temperature. DE-10044081A1 also proposes a similar resilient member for separating two contacts between which a solder-connection is formed. However, since the solder-connection is positioned, in both proposals, at a place far from a heat generating point, there is a possibility that an electric motor in the starter is damaged before the solder-connection shuts off the current supply. Further, since the resilient member is used in both proposals, a larger number of parts is required, resulting in a higher manufacturing cost. Further, DE-10044081 proposes to connect brushes and pig tails with solder. However, since the solder-connections are located far from the power source, it is difficult to shut off the current supply before other parts are damaged by heat.

SUMMARY OF THE INVENTION

The present invention has been made in view of the above-mentioned problem, and an object of the present invention is to provide an improved compact starter in which power supply is shut off without fail when the starter is about to overheat.

The starter for cranking an internal combustion engine is composed of an electric motor, an output shaft driven by the electric motor, a pinion gear spline-coupled to the output shaft, and a magnetic switch for engaging the pinion gear with a ring gear of the engine and for supplying electric current to the electric motor. The electric motor includes a stator for providing a magnetic field and an armature rotating in the stator. The armature has a commutator with which brushes are slidably in contact to thereby supply electric current to the armature from an on-board battery. In the power supply circuit, a switch having a stationary contact and a movable contact driven by a plunger of the magnetic switch is disposed.

The movable contact is connected to the brush through a brush lead wire. On end of the brush lead wire is mechanically and electrically connected to the brush and the other end of the brush lead wire is directly connected to the movable contact by soft-soldering which is formed at a low temperature such as 300° C. The connection formed by the soft-soldering is positioned in the vicinity of the commutator which generates a large amount of heat. The magnetic switch and the switch are enclosed in an end cover not to be cooled, so that the connection formed by the soft-soldering reaches a high temperature when the starter is about to overheat. Further, the brush lead wire is so made that a certain pulling force is applied to the movable contact when the switch is closed.

Since the connection formed by the soft-soldering is located close to the commutator and heat generated on the commutator surface is easily conducted to the connection through the brush lead wire, the temperature of the connection easily becomes high under unusual situations, e.g., when current is continuously supplied to the electric motor for some reasons. Further, since the connection is enclosed by the end cover, the heat of the connection is not easily dissipated. Therefore, the connection formed by the soft-soldering melts away before other components of the starter are damaged by heat. In addition, since there is a force pulling away the brush lead wire from the connection, the brush lead wire is quickly separated from the movable contact when the connection melts away. Therefore, it is not necessary to provide a resilient member for separating the lead wire from the movable contact.

An auxiliary switch may be connected in parallel to the switch in the power supply circuit. In this case, the auxiliary switch is adapted to close before the switch is closed and to supply a limited amount of current to the electric motor, so that a process of establishing engagement between the pinion gear and the ring gear is slowly performed. The present invention is advantageously applied to a starter, a pinion gear of which is engaged with a ring gear of the engine while restricting rotation of the pinion gear.

Other objects and features of the present invention will become more readily apparent from a better understanding of the preferred embodiments described below with reference to the following drawings.

DETAILED DESCRIPTION OF THE PREFERRED EMBODIMENTS

Figure 1:
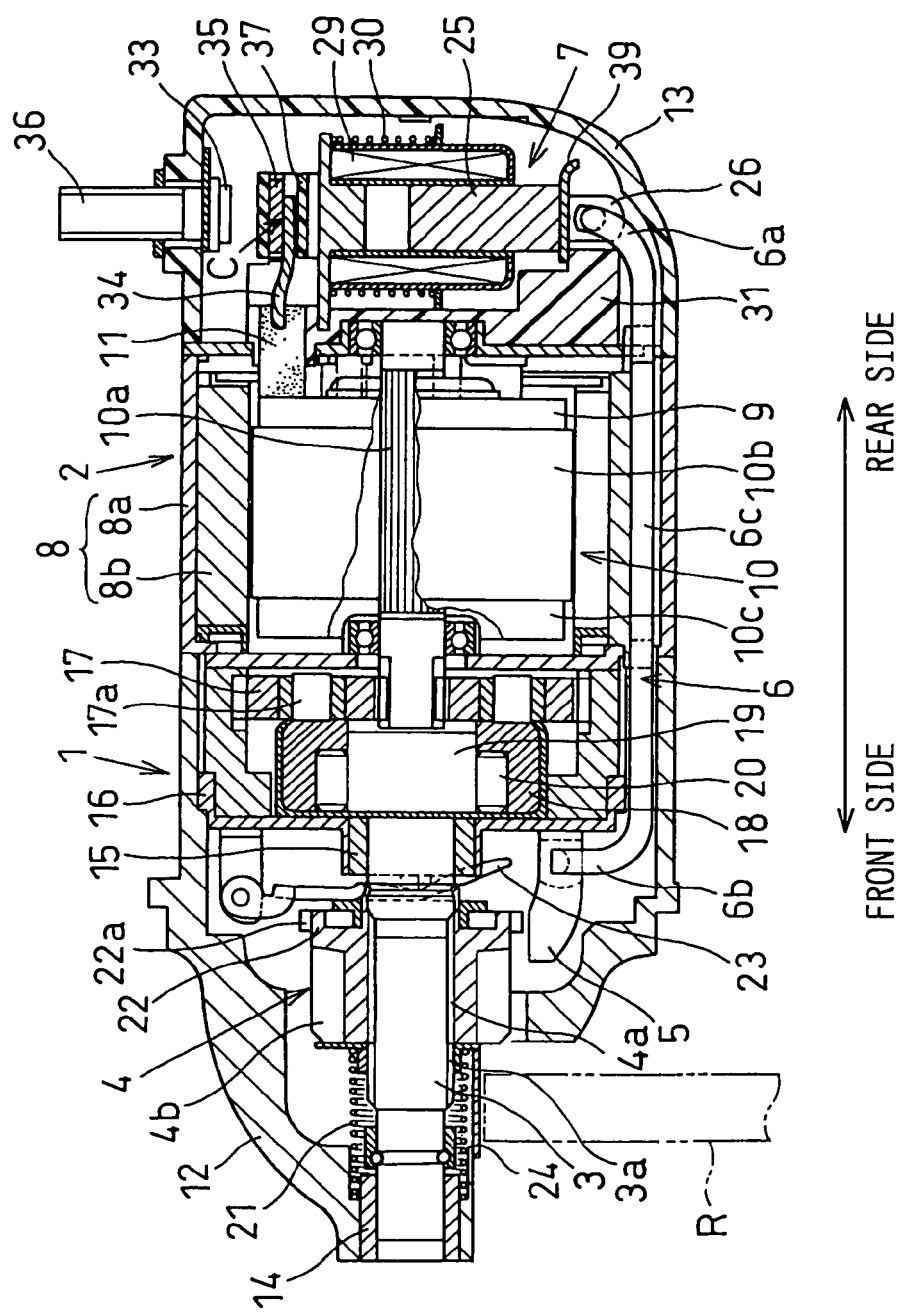
FIG. 1 is a cross-sectional view showing a starter for cranking an internal combustion engine, as a first embodiment of the present invention.

A first embodiment of the present invention will be described with reference to FIGS. 1–4. FIG. 1 shows a starter 1 for cranking an internal combustion engine, to which the present invention is applied. This starter 1 is a so-called pinion-rotation-restricting type starter that is used for cranking a relatively small engine. The starter 1 is composed of: an electric motor 2 generating rotational torque; an output shaft 3 driven by the electric motor 2; a pinion unit 4 slidably coupled to the output shaft 3; a pinion-rotation-restricting member 5 that engages with the pinion unit 4 for restricting its rotation; a magnetic switch 7 that controls electric power supply to the electric motor 2 in an ON-and-OFF fashion and operation of the pinion-rotation-restricting member 5; and other associated components. The magnetic switch 7 includes a switch A (that will be described latter in detail) having a stationary contact 33 and a movable contact 35.

The electric motor 2 is a known type of motor that is composed of a stator 8 for supplying a magnetic field and an armature 10 rotatably disposed in the stator 8, the armature 10 having a commutator 9 through which electric current is supplied to the armature via brushes 11. The electric motor 2 is held between a front housing 12 and the end cover 13. The stator 8 is composed of a cylindrical yoke 8a and permanent magnets 8b disposed inside of the yoke 8a. The armature 10 includes an armature core 10b around which an armature coil 10c is wound, an armature shaft 10a press-fitted to a center hole of the armature core 10b. Coil ends of the armature coil 10c bent on a rear axial end surface of the armature core 10b are utilized as the commutator 9. Brushes 11 slidably contact on the surface of the commutator 9 in the axial direction of the armature 10.

The output shaft 3 is coaxially disposed with the armature shaft 10a at the front side of the starter 1 and is rotatably supported by a bearing 14 held in the front housing 12 and another bearing 15 held in a center case 16 that is disposed inside the front housing 12. A known type of a planetary gear speed reduction mechanism and an one-way clutch are interposed between the armature shaft 10a and the output shaft 3.

The planetary gear speed reduction mechanism is composed of a sun gear formed at the front end of the armature shaft 10a and planetary gears 17 engaging with the sun gear. Each planetary gear 17 rotates around a gear shaft 17a, and all the planetary gears orbit around the sun gear. The one-way clutch is composed of a clutch outer 18 to which the gear shafts 17a are fixed, a clutch inner 19 formed integrally with the output shaft 3, and clutch rollers 20 disposed between the clutch outer 18 and the clutch inner 19. The clutch outer 18 rotates together with the orbital rotation of the planetary gears 17, and transmits a rotational torque of the armature 10 to the clutch inner 19 via the rollers 20. Thus, the rotation of the armature 10, speed of which is reduced by the planetary gear reduction mechanism, is transmitted to the output shaft 3. Transmission of the rotational torque from the output shaft 3 to the armature 10 is interrupted by the one-way clutch.

The pinion unit 4 is composed of a pinion gear 4b and a flange 22 formed at a rear side of the pinion gear 4b. The flange 22 has a diameter larger than that of the pinion gear 4b, and a series of depressions 22a are formed on the outer periphery of the flange 22. A female spline 4a is formed in the inner bore of the pinion unit 4, and a male spline 3a is formed on the outer periphery of the output shaft 3. Both splines are coupled to each other, thereby the pinion unit 4 is spline-coupled to the output shaft 3 so that the pinion unit 4 slidably moves on the output shaft 3 in the axial direction while the output shaft 3 rotates. The pinion unit 4 is biased toward the rear side by a spring 21 disposed between the front end of the front housing 12 and the pinion unit 4.

A restricting member 23, which restricts movement of the pinion unit 4 toward the rear side after the pinion gear 4b engages with a ring gear R of the engine, is disposed at a rear side of the flange 22. The restricting member 23 functions in cooperation with the pinion-rotation-restricting member 5 in a manner described later in detail. A shutter 24 for closing or opening a front opening of the front housing 12 is disposed at the front side of the pinion unit 4 and is pushed toward the front axial end of the pinion unit 4 by the spring 21.

A crank bar 6 is made of a round metal rod, and both ends are bent in a crank shape. Thus, the crank bar 6 is composed of a straight portion 6*c*, a coupling end 6*a* and an operating end 6*b*. The coupling end 6*a* is coupled to a hook 26 formed on a plunger 25 of the magnetic switch 7. The operating end 6*b* is connected to the pinion-rotation-restricting member 5. The straight portion 6*c* extends in the axial direction through a space between permanent magnets 8*b* connected to the inner bore of the yoke 8*a* and is rotatably supported by a pair of bearings (not shown). When the plunger 25 moves upward, the crank bar 6 is rotated and thereby the operating end 6*b* pushes up the rotation-restricting-member 5. The rotation-restricting-member 5 engages with the depressions 22*a* formed on the flange 22 of the pinion unit 4. Thus, the rotation of the pinion unit 4 is restricted before the electric motor 2 rotates.

The structure of the magnetic switch 7 will be described with reference to FIGS. 1 and 4. The magnetic switch 7 is composed of a coil 29 to which electric current is supplied from a battery 28, a plunger 25 disposed inside the coil 29 and driven by the magnetic force generated in the coil 29, a return spring 30 that biases the plunger 25 downward, and other associated components. The magnetic switch 7 is disposed at the rear side of the electric motor 2 so that the plunger 25 is positioned perpendicularly to the axial direction of the armature 10 and is contained in the rear cover 13. The magnetic switch 7 is connected to a mounting base 31 that is fixedly positioned in the rear cover 13.

Figure 4:
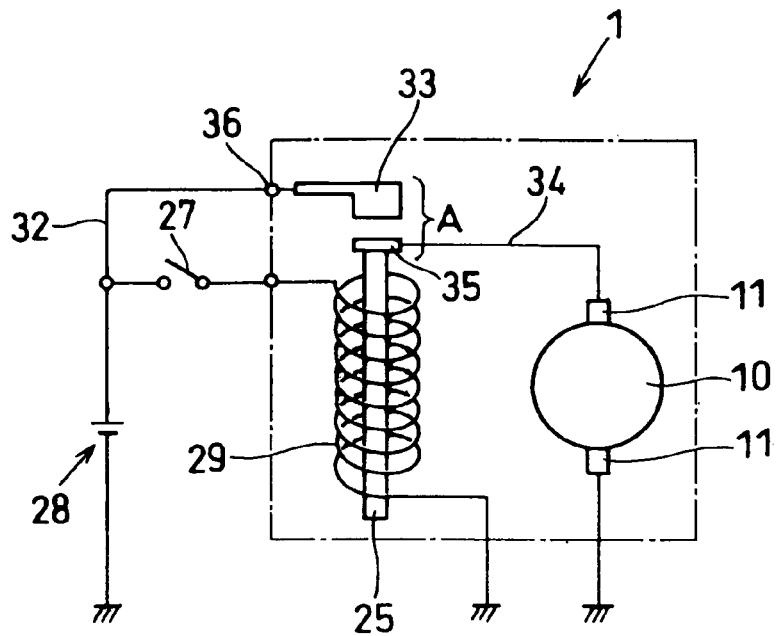
FIG. 4 is a circuit diagram showing electric connections in the starter.

As shown in FIG. 4, the switch "A" is composed of a stationary contact 33 connected to the battery 28 via a battery cable 32 and a movable contact 35 connected to the brush (plus side) 11 via a brush lead wire 34. As shown in FIG. 1, the stationary contact 33 is integrally formed with a terminal bolt 36 and positioned inside the end cover 13. The battery cable 32 is connected to the terminal bolt 36 extending from the end cover 13.

Figure 2:
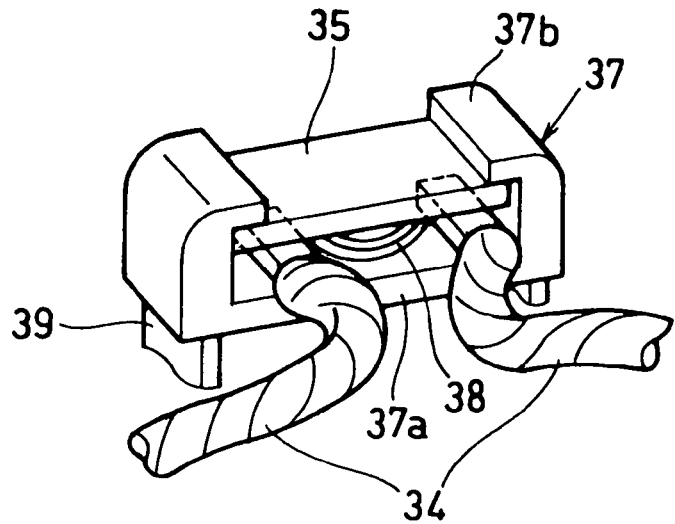
FIG. 2 is a perspective view showing a structure for holding a movable contact.

As shown in FIG. 1, the movable contact 35 is held by a holder 37 made of insulating resin together with a spring 38 (refer to FIG. 2) and is positioned close to the plus side brush 11. The movable contact 35 held by the holder 37 faces the stationary contact 33. The holder 37 is mechanically connected to the plunger 25 of the magnetic switch 7 via a holder stay 39 and moves together with the plunger 25. The movable contact 35 is held by the holder 37 as shown in FIG. 2. That is, the movable contact 35 is biased against a pair of claws 37*b* by the spring 38 disposed between the movable contact 35 and a base plate 37*a* of the holder 37. The spring 38 gives a pushing force to the movable contact 35 when the movable contact 35 contacts the stationary contact 33, thereby a proper contact pressure is given between the stationary contact 33 and the movable contact 35.

Figure 3:
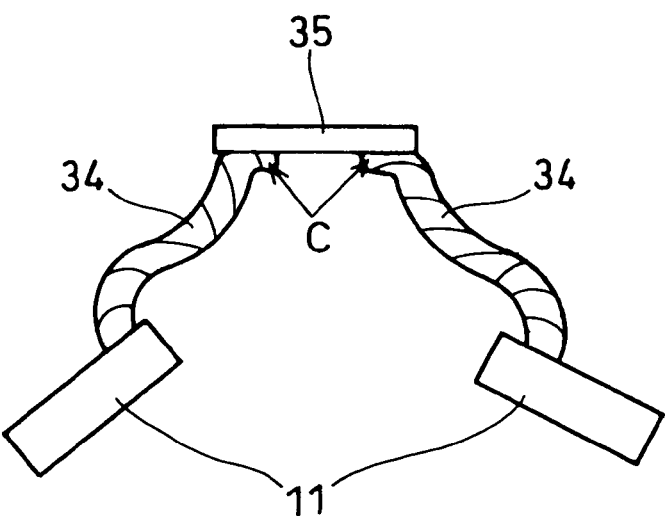
FIG. 3 is a plan view showing a connection between a movable contact and a brush lead wire, the connection being made by soft-soldering.

As shown in FIG. 3, one end of the brush lead wire 34 is mechanically and electrically connected to the plus side brush 11. The other end of the brush lead wire 34 is directly connected to a rear surface of the movable contact 35 (a front surface of the movable contact 35 contacts the stationary contact 33) by soft-soldering. The soft-soldering is performed at a low temperature such as 300° C.

Operation of the starter 1 described above will be described below. Upon closing the key-switch 27, electric current is supplied to the coil 29 of the magnetic switch 7. The plunger 25 disposed inside the coil 29 is moved upward (in FIG. 1) by the magnetic force generated in the coil 29. The coupling end 6*a* of the crank bar 6 connected to the plunger 25 moves upward, and thereby the pinion-rotation-restricting member 5 connected to the operating end 6*b* of the crank bar 6 also moves upward. The pinion-rotation-restricting member 5 engages with the depression 22*a* formed on the flange 22. Thus, rotation of the pinion unit 4 is restricted.

On the other hand, according to the upward movement of the plunger 25, the movable contact 35 contacts the stationary contact 33 (the switch "A" is closed). Electric current is supplied to the electric motor 2 from the battery 28, and thereby the electric motor 2 rotates. The rotation of the electric motor 2 is transmitted to the output shaft 3 via the planetary gear speed reduction mechanism and the one-way clutch, the rotational speed of the electric motor 2 being reduced by the planetary gear speed reduction mechanism. When the output shaft 3 rotates, the pinion unit 4 that is spline-coupled to the output shaft 3 is pushed forward (toward the ring gear R of the engine) on the output shaft 3, because the rotation of the pinion unit 4 is restricted. Thus, the pinion gear 4*b* engages with the ring gear R.

When the pinion gear 4*b* engages with the ring gear R, the restriction of its rotation is released and a backward movement of the pinion unit 4 is restricted by the restricting member 23, because the pinion-rotation-restricting member 5 is separated from the depression 22*a* of the flange 22 and is positioned at the rear side of the restricting member 23. The pinion gear 4*b* engaging with the ring gear R is rotated by the output shaft 3, and thus, the engine is cranked up.

After the engine is cranked up, the key-switch 27 is opened. The magnetic force generated in the coil 29 disappears, and the plunger 25 returns to its original position (the position shown in FIG. 1) due to the biasing force of the return spring 30. According to this downward movement of the plunger 25, the crank bar 6 is rotated and the pinion-rotation-restricting member 5 returns to its original position. The pinion unit 4 moves backward to its original position due to the biasing force of the spring 21, because the pinion-rotation-restricting member 5 comes out of the rear surface of the restricting member 5 and allows the restricting member 5 to move backward. Power supply to the electric motor 2 is shut off in response to opening of the switch "A", which is caused by the downward movement of the plunger 25.

Advantages of the present invention are as follows. The magnetic switch 7 is contained in the end cover 13, and the plunger 25 is positioned perpendicularly to the armature shaft 10*a*. Therefore, the movable contact 35 connected to the plunger 25 can be positioned close to the brush 11 that slidably contacts the commutator 9. A large amount of heat generated on the commutator surface can be easily conducted to the connection C (refer to FIG. 3) formed by the soft-soldering between the movable contact 35 and the brush lead wire 34 through the brush lead wire 34. The commutator surface is the position where the temperature in the starter 1 becomes the highest, and the connection C is located in the space enclosed by the end cover 13. Therefore, the temperature of connection C becomes nearly the highest in the starter 1. Accordingly, when the temperature in the starter 1 becomes unusually high for some reason, the connection C melts away quickly and shuts off the power supply to the electric motor 2 before other portions of the starter 1 are damaged by the heat.

Since the connection C is made by soft-soldering, electric resistance at the connection C can be kept low. In a conventional fuse that is formed by partially decreasing a cross-sectional area of a power supply circuit, the electric resistance becomes high, and the output of the starter is sacrificed.

The movable contact 35 is pulled by the brush lead wire 34 when the movable contact 35 is in contact with the stationary contact 33. Therefore, the brush lead wire 34 is easily and quickly separated from the movable contact 35 without providing a resilient member for separating both (as done in the conventional starter described above) when the connection C melts away due to a high temperature. If the brush lead wire 34 is welded to the movable contact 53 at a high temperature such as 500° C., the brush lead wire 34 may be deteriorated by heat. According to the present invention, however, the connection C is formed by soft-soldering at a low temperature about 300° C. Therefore, the brush lead wire 34 is not deteriorated and is able to be used for a long time.

Figure 6:
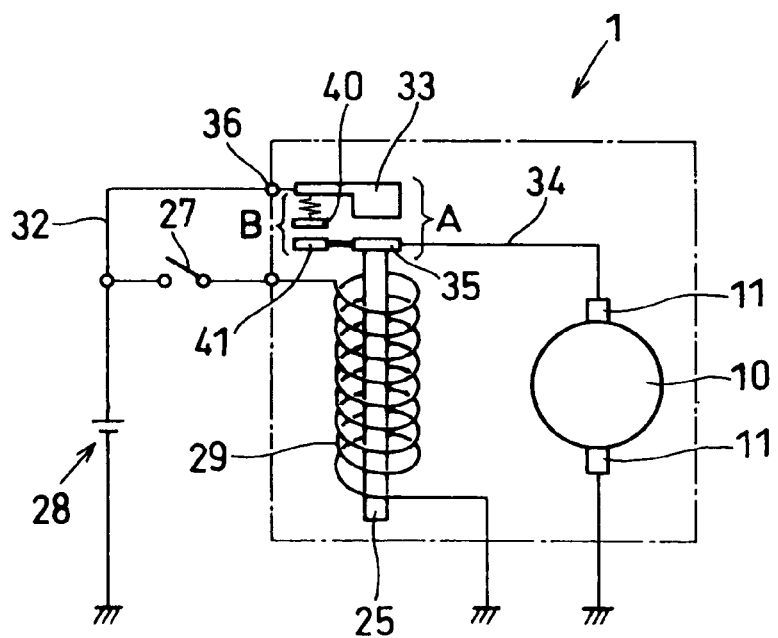
FIG. 6 is a circuit diagram showing electrical connections in the starter shown in FIG. 5.
Figure 5:
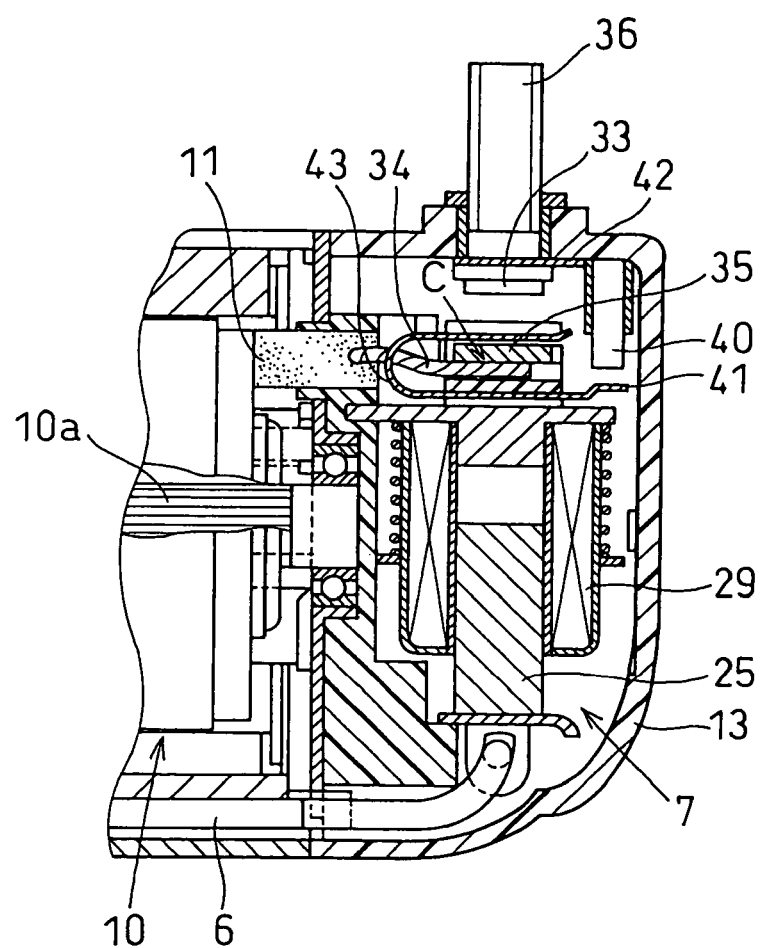
FIG. 5 is a cross-sectional view showing a rear portion of a starter, as a second embodiment of the present invention.

A second embodiment of the present invention will be described with reference to FIGS. 5 and 6. In this embodiment, an auxiliary switch "B" is connected in parallel to the switch "A". The auxiliary switch B is composed of an auxiliary stationary contact 40 electrically connected to the stationary contact 33 and an auxiliary movable contact 41 electrically connected to the movable contact 35. The auxiliary stationary contact 40 is made of a material having resistance higher than that of the stationary contact 33, such as carbon, and is electrically connected to the auxiliary contact 33 through a metal plate 42 that is fixed to the end cover 13 together with the terminal bolt 36. Alternatively, the auxiliary stationary contact 40 may be made of a material such as copper and a member having a higher resistance may be connected between the auxiliary stationary contact 40 and the stationary contact 33.

The auxiliary movable contact 41 is made of a resilient metal plate 43 (e.g., copper plate) formed in a U-shape, and electrically connected to the movable contact 35. The auxiliary movable contact 41 is held by the holder 37 together with the movable contact 35. The resilient metal plate 43 also functions as a contact spring that provides a contacting force between the auxiliary stationary contact 40 and the auxiliary movable contact 41 when they are closed. A distance between the auxiliary stationary contact 40 and the auxiliary movable contact 41 is made smaller than a distance between the stationary contact 33 and the movable contact 35, so that the auxiliary switch B closes before the main switch A closes. The auxiliary switch B is positioned very close to the switch A.

Operation of the second embodiment will be briefly described. The process of restricting rotation of the pinion unit 4 is the same as that of the first embodiment. After the pinion rotation is restricted, the auxiliary switch B is closed, and a small amount of current (because the current is restricted by the resistance in the auxiliary switch B) is supplied to the electric motor 2. While the output shaft 3 is driven by the electric motor 2 at a low speed, the pinion unit 4 is pushed forward slowly. The pinion gear 4b slowly engages with the ring gear R. Because the pinion gear 4b is slowly pushed forward, a collision impact between the pinion gear 4b and the ring gear R is alleviated and the engagement between the pinion gear 4b and the ring gear R is smoothly established. Until the engagement between the pinion gear 4b and the ring gear R is established, the switch A is not closed because the upward movement of the plunger 25 is hindered by the crank bar 6 coupled to the depression 22a of the flange 22.

After the pinion gear 4b engages with the ring gear R, the plunger 25 moves further upward and the switch A is closed. A full amount of current is supplied to the electric motor 2, and the electric motor 2 rotates at a full speed thereby to crank up the engine.

The connection C (refer to FIG. 3) between the brush lead wire 34 and the movable contact 35 in this embodiment is formed by soft-soldering in the same manner as in the first embodiment. Therefore, the connection C is quickly opened before other portions in the starter 1 are damaged by unusually high temperature. Thus, the power supply to the electric motor 2 is quickly shut off, and thereby the starter 1 is protected form overheating. In this embodiment, the auxiliary switch B is positioned close to the switch A, and heat generated in the auxiliary switch B is transferred to the connection C in addition to a large amount of heat conducted to the connection C through the brush lead wire 34. Therefore, the connection C is further quickly opened when the temperature becomes unusually high.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A starter for cranking an internal combustion engine having a ring gear, the starter comprising:
    an electric motor having a stator for providing a magnetic field and an armature adapted to rotate in the stator, the stator including a cylindrical yoke forming a magnetic circuit, the armature including a commutator with which brushes are slidably in contact to supply electric current to the armature;
    a magnetic switch including a coil for generating a magnetic force by supplying electric current thereto and a plunger disposed in the coil and driven by the magnetic force;
    an electric circuit for supplying electric current to the armature from a battery;
    a switch for selectively opening and closing the electric circuit according to movement of the plunger, the switch including a stationary contact connected to the battery and a movable contact connected to the brush via a brush lead wire, wherein:
    one end of the brush lead wire is electrically and mechanically connected to the brush and the other end of the lead wire is directly connected to the movable contact by soft-soldering.

2. The starter for cranking an internal combustion engine as in claim 1, wherein:
    the movable contact is positioned in the vicinity of the brush.

3. The starter for cranking an internal combustion engine as in claim 1, further including an auxiliary switch connected in parallel to the switch, wherein:
    the auxiliary switch is adapted to be closed, before the switch is closed, to supply electric current, an amount of which is smaller than that supplied when the switch is closed, to the armature; and
    the auxiliary switch is positioned in the vicinity of the movable contact of the switch.

4. The starter for cranking an internal combustion engine as in claim 1, wherein:
   one axial end of the cylindrical yoke is closed with an end cover; and
   the switch and the magnetic switch are contained in and covered with the end cover.

5. The starter for cranking an internal combustion engine as in claim 3, wherein:
   one axial end of the cylindrical yoke is closed with an end cover; and
   the switch, the auxiliary switch and the magnetic switch are contained in and covered with the end cover.

6. The starter for cranking an internal combustion engine as in claim 1, the starter further comprising:
   an output shaft driven by the electric motor; a pinion unit coupled to the output shaft by means of a helical spline; a pinion-rotation-restricting member adapted to engage with the pinion unit to restrict rotation of the pinion unit; and a crank bar rotatively driven by the plunger for bringing the pinion-rotation-restricting member into engagement with the pinion unit, thereby thrusting the pinion unit on the output shaft toward the ring gear of the internal combustion engine and establishing engagement between the pinion unit and the ring gear.

7. The starter for cranking an internal combustion engine as in claim 3, the starter further comprising:
   an output shaft driven by the electric motor; a pinion unit coupled to the output shaft by means of a helical spline; a pinion-rotation-restricting member adapted to engage with the pinion unit to restrict rotation of the pinion unit; and a crank bar rotatively driven by the plunger for bringing the pinion-rotation-restricting member into engagement with the pinion unit, thereby thrusting the pinion unit on the output shaft toward the ring gear of the internal combustion engine and establishing engagement between the pinion unit and the ring gear, wherein:
   the pinion-rotation-restricting member is brought into engagement with the pinion unit before the auxiliary switch is closed; then the auxiliary switch is closed to slowly rotate the output shaft, thereby thrusting the pinion unit toward the ring gear and establishing engagement between the pinion unit and the ring gear; and then the main switch is closed to supply a full current to the electric motor and to crank up the engine.

* * * * *